Oct. 12, 1965     J. BOCHAN     3,211,015
MEANS FOR REVERSING THE DIRECTION OF ROTATION
OF A PULLEY-TYPE MEMBER
Filed Feb. 26, 1964
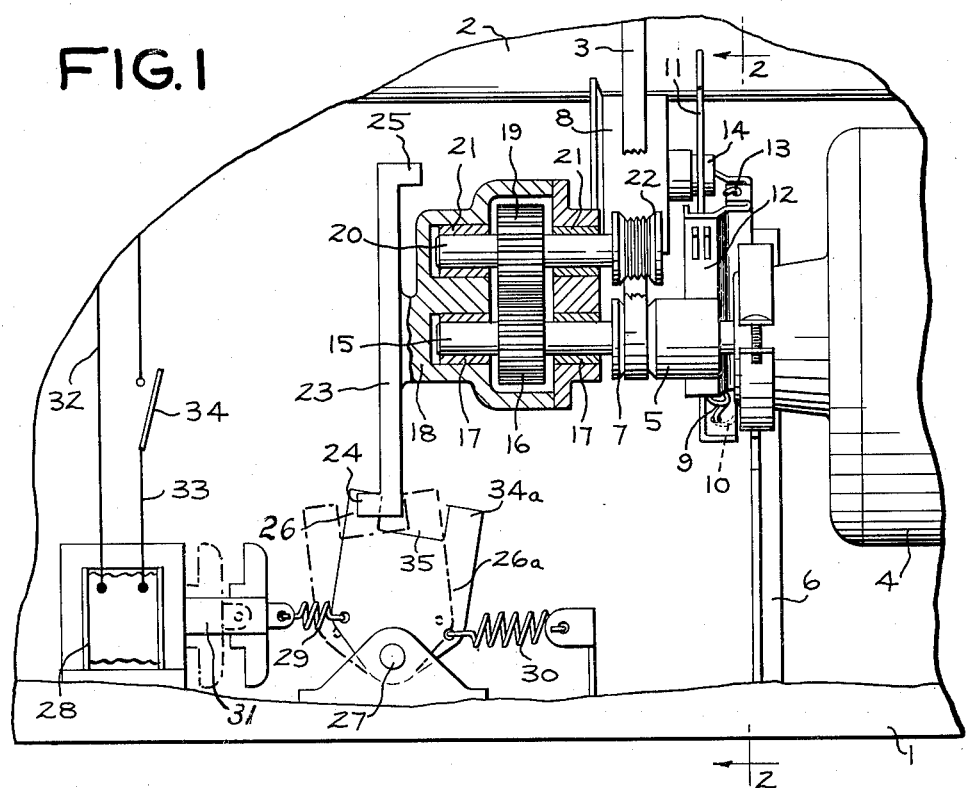
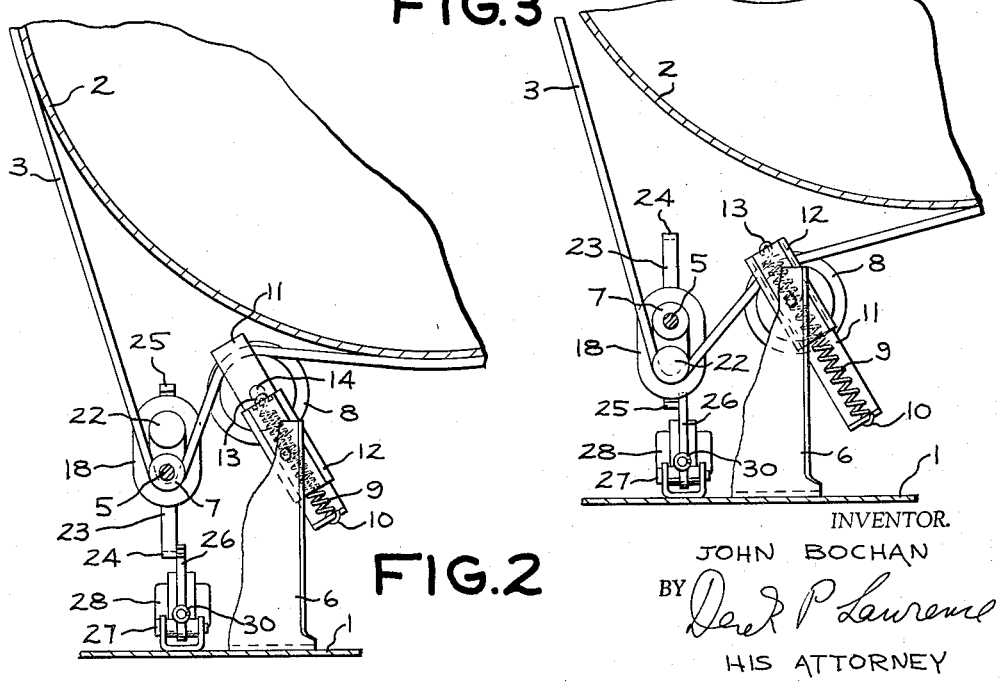
INVENTOR.
JOHN BOCHAN
BY Derek P. Lawrence
HIS ATTORNEY

United States Patent Office 3,211,015
Patented Oct. 12, 1965

3,211,015
MEANS FOR REVERSING THE DIRECTION OF ROTATION OF A PULLEY-TYPE MEMBER
John Bochan, Louisville, Ky., assignor to General Electric Company, a corporation of New York
Filed Feb. 26, 1964, Ser. No. 347,505
7 Claims. (Cl. 74—220)

This invention relates to reversing means, and more particularly to means for reversing the direction of movement of a belt driving a pulley-type member.

It is an object of my invention to provide a simple, effective and economical structure for effecting reversal of rotational movement of a member driven from a unidirectional power source.

In one aspect of my invention, a first pulley is arranged to be rotated by a prime mover, and is positioned in driving relation to an endless belt which, in turn, causes rotation of a driven pulley-type member. An assembly, which includes a second pulley, is movable between first and second positions. At least in the second position, the assembly is operated by the first pulley, causing the second pulley to be rotated in the same plane of rotation as the first pulley but in the opposite direction thereto. Also, in the second position of the assembly, the second pulley is moved into driving engagement with the belt, and the belt is forced out of driven engagement with the first pulley.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawing.

In the drawing, FIGURE 1 is a side elevational view of my invention, partly in cross section;

FIGURE 2 is a view along line 2—2 in FIGURE 1, for one direction of rotation; and FIGURE 3 is a view similar to that of FIGURE 2 for the opposite direction of rotation.

Referring now to the drawing, there is shown a segment of a machine structure in which my invention may be used. In the present case, it is contemplated that a machine having a base 1 will be provided, and that the machine will have a generally cylindrical member 2 intended to be rotated by a belt 3. Rotation of member 2 in opposite directions is to be provided despite the fact that the source of power provided for the rotation of belt 3 is a unidirectional motor 4, that is, a motor having an output shaft 5 which rotates in a single direction. The support of the motor may be effected in the conventional way such as, for instance, by providing support members such as 6 at each end thereof.

At the end of shaft 5, there is formed a pulley 7 around which passes belt 3. Thus, as can best be seen from FIGURE 2, the belt 3 passes around both the pulley 7 and the member 2; member 2 in this case performs the function of a pulley, so that it is rotatably driven by belt 3 from pulley 7.

Appropriate tensioning of the belt is effected by the provision of an idler member 8 which engages the belt, as shown, so as to provide the desired amount of tension. Member 8 is biased into engagement with the belt by means of a spring 9 which has one end 10 secured to a member 11 slidably mounted in a carrier 12 to which the other end 13 of the spring is connected. Member 8 is supported for rotation on a pin 14 secured on member 11. The carrier member 12 is supported on member 6. With this structure then, member 11 is movable by spring 9 so as to bias the idler pulley 8 into engagement with belt 3 with a force determined by the characteristics of the spring 9.

A shaft extension 15 is formed on pulley 7 coaxial with shaft 5 and pulley 7, so that, when pulley 7 is driven in a particular direction of rotation, shaft extension 15 rotates therewith. Shaft extension 15 has a gear member 16 rigidly secured thereon. Shaft extension 15 is rotatably mounted in bearings 17 formed within a casing or support member 18. It can be seen that, through the shaft extension 15 and the bearings 17, casing 18 is supported by shaft extension 15.

Gear 16 is in driving relation to a driven gear member 19 rigidly mounted on a shaft 20 which is rotatably supported in bearings 21 also formed in casing 18. Shaft 20 extends through to the outside of the casing, terminating in a second pulley member 22 which, as can be seen, is mounted for rotation in the same plane as that in which the first pulley 7 rotates. There is, however, the important difference that the rotation of the two pulleys is in opposite directions. This results from the fact that pulley 7 drives the first or driving gear 16 through shaft extension 15, and that this gear then engages gear 19 to drive it in the opposite direction. Gear 19 is on the same shaft as pulley 22, so that this opposite direction of rotation relative to gear 16 and pulley 7 prevails for both gear 19 and pulley 22. Thus, the support or casing 18 constitutes an assembly in effect, connected to be directly operated from pulley 7 and having as its terminal result the rotation of pulley 22 in the same plane as pulley 7 but in the opposite direction.

In the position shown in FIGURES 1 and 2 pulley 22 is out of engagement with belt 3, and the driving of the belt is therefore effected by the pulley 7 to provide rotation in a first predetermined direction as described. The assembly 18 may be retained in the position to effect this relationship by any suitable means. In the present case, the assembly 18 has been provided with a position-providing member 23 having tabs 24 and 25 extending in opposite directions therefrom at opposite ends thereof. Tab 24 is engageable with portion 26 of a member 26a, pivotably mounted at 27 on base 1, when member 26a is in the position shown in solid outline. This occurs when a solenoid member generally indicated by the numeral 28 is in the de-energized position shown wherein springs 29 and 30 cause the armature 31 of the solenoid to be pulled out as shown. In the position shown of member 26a, tab 25 of member 23 will not engage it; this ensures that the assembly 18 will assume the position shown, wherein the tab 24 is retained in the desired position by part 26 of member 26a. This then causes rotation of belt 3 by pulley 7.

If rotation of belt 3 in the opposite direction is desired, solenoid 28 is energized. This is effected through appropriate electrical conductors 32 and 33 by the closing of a switch 34. When the solenoid is energized, armature 31 is pulled in and this in turn overcomes the bias of springs 29 and 30 to move member 26a to the position shown in dotted outline. When this happens, only tab 25 can engage part 34a of member 26a, and tab 24 can rotate freely through the recess 35 in the top of member 26a.

Because of this, the position of assembly 18 is changed 180° before it assumes its second stable position. In other words, the assembly 18, using shaft extension 15 as a pivot, swings in a vertical plane until it is in the position shown in FIGURE 3. This movement starts quite slowly as a result of friction between shaft extension 15 and bearing 17. As soon as pulley 22 touches belt 3, there is a locking action between pulleys 7 and 22 through belt 3, and consequently the belt turns assembly 18, as a unit, until it becomes retained in the position shown in FIGURE 3. In this position, pulley 22 is in engagement with belt 3, and the belt is out of engagement with pulley 7. The appropriate tension on the belt continues to be provided by idler member 8 in the same manner as previously described, the spring 9 acting to maintain the tension despite the changed conditions in the driving of the belt. As has been explained, pulley 22 is rotating in the opposite direction to pulley 7. Therefore, when pulley 7 ceases to engage belt 3 and pulley 22 engages the belt, the direction of rotation imparted from motor 4 is reversed even though the motor continues to rotate in the same direction as before.

It will thus been seen that a simple structure has been provided which, simply through the energization of the solenoid 28, automatically provides for the reversal of a belt driven by a unidirectional motor. This is done without any requirement for clutches or other specialized and relatively expensive components. It will, of course, readily be understood that a cyclically reversing mechanism may be provided in this manner simply by causing cyclic opening and closing of switch 34.

While in accordance with the patent statutes I have described what at present is considered to be the preferred embodiment of my invention, it will be obvious to those skilled in the art that various changes and modifications may be made therein without departing from the invention, and it is therefore aimed in the appended claims to cover all such equivalent variations as fall within the true spirit and scope of my invention.

What I claim as new and desire to secure by Letters Patent of the United States is:

1. Means for reversing the direction of rotation of a pulley-type member driven by an endless belt comprising:
   (a) a first pulley arranged to be rotated by a prime mover and positioned in driving relation to the belt;
   (b) and an assembly including a second pulley and movable by said first pulley between first and second positions;
   (c) said second pulley being drivenly connected to said first pulley for rotation in the same plane of rotation as said first pulley and in the opposite direction thereto;
   (d) said assembly, upon movement to said second position, moving said second pulley into engagement with the belt to force the belt out of driven engagement with said first pulley and to drive the belt in the opposite direction.

2. The apparatus defined in claim 1 wherein a shaft extension concentric with said first pulley extends therefrom and said assembly is pivotally mounted thereon, said assembly being pivotable about said shaft extension between its first and second positions.

3. Means for reversing the direction of rotation of a pulley-type member driven by an endless belt comprising:
   (a) a first pulley arranged to be rotated by a prime mover and positioned in driving relation to the belt;
   (b) a support member;
   (c) a driving member rotatably mounted on said support member and rotatable by said first pulley;
   (d) a driven member rotatably mounted on said support member and rotated by said driving member;
   (e) and a second pulley arranged to be rotatably mounted on said support member in the same plane of rotation as said first pulley, said second pulley being rotated by said driven member in the opposite direction relative to said first pulley;
   (f) said support member being movable between first and second positions by said driving member, in at least the second of which said driving member is rotated by said first pulley;
   (g) said support member, upon movement to said second position, moving said second pulley into engagement with the belt to force the belt out of driven engagement with said first pulley and to drive the belt in the opposite direction.

4. The apparatus defined in claim 3 wherein said driving member is directly connected to and is coaxial with said first pulley, said driven member is directly connected to and coaxial with said second pulley, and said driving member directly engages said driven member to rotate it in the opposite direction.

5. The apparatus defined in claim 4 wherein said driving and driven members are gears.

6. The apparatus defined in claim 3 wherein said support member is formed as a casing substantially enclosing said driving and driven members.

7. Means for reversing the direction of rotation of a pulley-type member driven by an endless belt comprising:
   (a) a first pulley arranged to be rotated by a prime mover and positioned in driving relation to the belt;
   (b) an assembly including a second pulley;
   (c) a shaft extension from said first pulley concentric therewith, said assembly being supported thereon and operated thereby, and being pivotable about said shaft extension between first and second positions;
   (d) said second pulley being rotated by said shaft extension in the same plane of rotation as said first pulley and in the opposite direction thereto, said assembly, upon movement to said second position, moving said second pulley into engagement with the belt to force the belt out of driven engagement with said first pulley and to drive the belt in the opposite direction;
   (e) position-providing means extending from said assembly;
   (f) and control means external to said assembly having first and second positions, said control means in its first position engaging said position-providing means to secure said assembly in its first postion, said control means in it second position engaging said position-providing means to secure said assembly in its second position.

References Cited by the Examiner

UNITED STATES PATENTS

| | | | |
|---|---|---|---|
| 1,007,957 | 11/11 | McCausland | 74—220 X |
| 1,811,038 | 6/31 | Amidon | 74—220 |
| 2,185,537 | 1/40 | Brownlee | 74—220 X |
| 2,299,563 | 10/42 | Carlson et al. | 74—376 |
| 2,445,797 | 7/48 | Moore | 74—220 X |
| 2,729,299 | 1/56 | Rink | 74—220 X |

DON A. WAITE, *Primary Examiner.*